United States Patent
Tonosaki et al.

(10) Patent No.: US 8,574,699 B2
(45) Date of Patent: Nov. 5, 2013

(54) RECORDING MEDIUM AND METHOD FOR MANUFACTURING RECORDING MEDIUM

(75) Inventors: Katsuya Tonosaki, Miyagi (JP); Takeshi Gouko, Miyagi (JP)

(73) Assignee: Sony Corporation, Tokyo (JP)

( * ) Notice: Subject to any disclaimer, the term of this patent is extended or adjusted under 35 U.S.C. 154(b) by 1 day.

(21) Appl. No.: 13/326,000

(22) Filed: Dec. 14, 2011

(65) Prior Publication Data

US 2012/0189799 A1    Jul. 26, 2012

(30) Foreign Application Priority Data

Jan. 20, 2011  (JP) .................... 2011-009383

(51) Int. Cl.
*G11B 7/24* (2013.01)
(52) U.S. Cl.
USPC .................. 428/64.1; 428/64.4; 430/270.11
(58) Field of Classification Search
USPC ................... 428/64.4; 430/270.11
See application file for complete search history.

(56) References Cited

U.S. PATENT DOCUMENTS

2008/0291815 A1* 11/2008 Edwards .............. 369/283

FOREIGN PATENT DOCUMENTS

| JP | 2001014741 | 1/2001 |
| JP | 2007179718 | 7/2007 |
| JP | 2007226932 | 9/2007 |

* cited by examiner

*Primary Examiner* — Elizabeth Mulvaney
(74) *Attorney, Agent, or Firm* — K&L Gates LLP

(57) ABSTRACT

A recording medium includes a substrate having a label-side surface on one side and a recording layer for recording and reproducing information on the other side. The label-side surface of the substrate has a mirror surface portion and a rough surface portion, a step having a step height of 10 μm or less is formed between the mirror surface portion and the rough surface portion, and an average roughness of the rough surface portion is between 10 μm and 2 μm, inclusive. Visible information is formed on the label-side surface by using the mirror surface portion and the rough surface portion.

6 Claims, 7 Drawing Sheets

FIG. 7

STEP HEIGHT

|  | 0 μm | 5 μm | 10 μm | 15 μm | 20 μm |
|---|---|---|---|---|---|
| 5 μm | 10 nm | 13 nm | 17 nm | 22 nm | 28 nm |
| 10 μm | 14 nm | 17 nm | 19 nm | 24 nm | 31 nm |
| 15 μm | 22 nm | 24 nm | 27 nm | 31 nm | 35 nm |
| 20 μm | 28 nm | 31 nm | 35 nm | 39 nm | 44 nm |

ROUGHNESS

RECORDING MEDIUM AND METHOD FOR MANUFACTURING RECORDING MEDIUM

CROSS REFERENCES TO RELATED APPLICATIONS

The present application claims priority to Japanese Priority Patent Application JP 2011-009383 filed in the Japan Patent Office on Jan. 20, 2011, the entire content of which is hereby incorporated by reference.

BACKGROUND

The present application relates to a recording medium, such as an optical disc, and a method for manufacturing the recording medium.

Optical discs, such as a compact disc (CD), a digital versatile disc (DVD), and a Blu-ray® Disc, are widely used for recording and reproducing music, images, and data.

In order to ship the discs to market, such optical discs have a variety of information, such as the title of recorded content, the disc type, the name of a manufacturer, or a design pattern printed on the label-side surface thereof opposite the recording surface onto which a laser beam is emitted.

Japanese Unexamined Patent Application Publication No. 2001-14741 describes a technique for forming pits (a rough surface portion) on the label-side surface of a transparent resin substrate so as to display visible graphics or text. In addition, Japanese Unexamined Patent Application Publication Nos. 2007-179718 and 2007-226932 describe a technique for processing the label-side surface of a substrate into a satin surface.

SUMMARY

In order to display necessary information without printing the information on the label-side surface, a difference in contrast between a rough surface and a mirror surface can be used, as described in Japanese Unexamined Patent Application Publication No. 2001-14741. However, if this technique is applied to a high-density disc, such as a Blu-ray disc, a recording/reproduction operation may be deteriorated. For example, the quality of a tracking error signal may be decreased. In addition, since display is performed using a difference in contrast between a rough surface and a mirror surface, it is necessary to ensure an excellent visibility.

Accordingly, the present application provides a recording medium that provides excellent visibility and recording/reproduction performance by forming the rough surface portion into an appropriate shape rather than by simply forming the rough surface portion.

According to an embodiment of the present application, a recording medium includes a substrate having a label-side surface on one side and a recording layer for recording and reproducing information on the other side. The label-side surface of the substrate has a mirror surface portion and a rough surface portion, a step having a step height of 10 µm or less is formed between the mirror surface portion and the rough surface portion, and an average roughness of the rough surface portion is between 10 µm and 2 µm, inclusive. Visible information is formed on the label-side surface by using the mirror surface portion and the rough surface portion. For example, the height of the step of the rough surface portion is set to a value between 10 µm and 1 µm inclusive, and the average roughness of the rough surface portion is set to about 5 µm.

According to another embodiment of the present application, a method for manufacturing a recording medium is provided. The method includes generating a substrate having one surface serving as a label-side surface and the other surface having an irregularity pattern for forming a recording layer, where the label-side surface includes a mirror surface portion and a rough surface portion having a step of 10 µm or less formed therebetween, average roughness of the rough surface portion is between 10 µm and 2 µm inclusive, and visible information is formed on the label-side surface by using the mirror surface portion and the rough surface portion, and forming, on the irregularity pattern of the substrate, a layer structure including at least a recording layer and a cover layer. For example, in generating a substrate, the above-described rough surface portion is generated so that the step height of the above-described rough surface portion is set to a value between 10 µm and 1 µm, inclusive, and the average roughness of the above-described rough surface portion is set to about 5 µm.

According to such technology, various information can be displayed on the label-side surface of the recording medium by using the contrast between the rough surface portion and the mirror surface portion. In addition, even when the rough surface portion is formed, the rough surface portion does not have an adverse impact on the recording and reproduction performance.

According to the above-described technology, display having an excellent visibility can be realized on the label-side surface by using the rough surface portion and the mirror surface portion. In addition, in manufacturing a recording medium, an efficient printing process and cost reduction can be provided. Furthermore, a recording medium that does not have any adverse impact on the recording and reproduction performance (the tracking performance) can be provided.

Additional features and advantages are described herein, and will be apparent from the following Detailed Description and the figures.

BRIEF DESCRIPTION OF THE FIGURES

FIG. 7 illustrates a relationship between the rough surface portion and the tracking error signal.

DETAILED DESCRIPTION

The present application will be described in detail below with reference to the figures according to an embodiment. In addition, the description is provided according to the following order:
1. Optical Disc
2. Disc Manufacturing Process Flow
3. Effect of Rough Surface Portion on Tracking Operation and Visibility.

1. Optical Disc

Embodiments of the present application are described below with reference to a Blu-ray disc (BD) as an optical disc serving as a recording medium. A BD is briefly described next. As a disc size, a BD has a diameter of 120 mm and a thickness of 1.2 mm. That is, in terms of the external size, a BD has a size that is the same as that of a CD disc or a DVD disc. In addition, in order to record and reproduce data, a blue laser (e.g., the wavelength $\lambda=405$ nm) is used. Furthermore, the optical system has a high NA (e.g., NA=0.85). Still furthermore, a narrow track pitch (e.g., the track pitch=0.32 µm) and high line density (e.g., the recording line density=0.112 µm/bit) are provided. Thus, a disc having a diameter of 12 cm and a single-layer structure has a user data capacity of about 25 Giga byte (GB). If a further high-density recording technique is employed, a capacity of about 27 GB can be realized. In addition, a so-called multilayer disc having a plurality of recording layers has been developed. A multilayer disc has a user data capacity that is substantially equal to the capacity per layer times the number of layers.

Examples of a BD optical disc include a BD-ROM (Blu-ray Disc Read Only Memory), a BD-R (Blu-ray Disc Recordable), and a BD-RE (Blu-ray Disc Rewritable). A BD-ROM is a read only optical disc. A BD-ROM stores information recorded in a recording layer in the form of an embossed pit string.

A BD-R is a one time recordable disc that complies with the Blu-Ray disc standard. A BD-RE is a rewritable disc that complies with the Blu-Ray disc standard. The disc substrates of a BD-R and a BD-RE have substantially the same structure. The disc substrates have only a groove preformed therein and do not have a pit string. The track pitch of the groove is 320 nm in almost all the areas including a data recording area except for the area of the innermost periphery PIC (Permanent Information & Control data) area. The track pitch of the groove in the PIC area is 350 nm. The disc substrates have a single spiral structure. In addition, the depth of the groove is about 25 nm, in general. The unique information, such as address information, is recorded in the groove itself by wobbling.

Figure 1A:
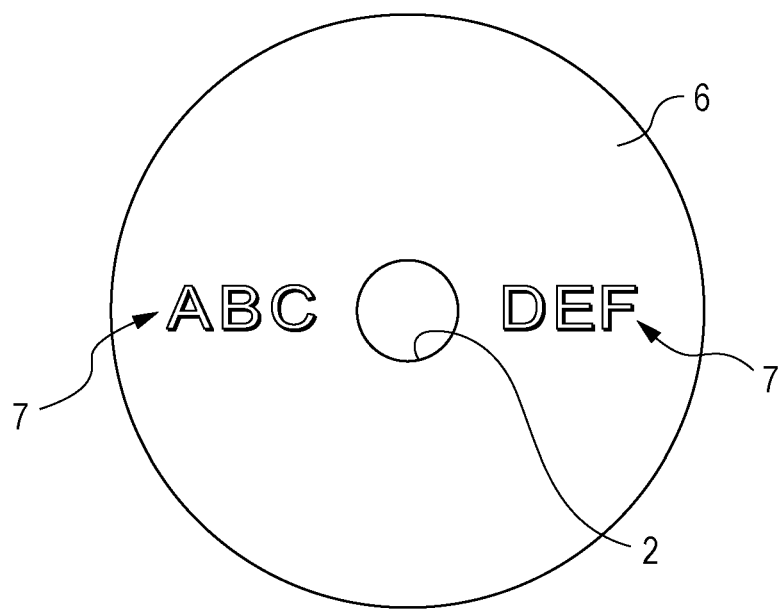
FIGS. 1A and 1B illustrate a mirror surface portion and a rough surface portion of an optical disc according to an embodiment of the present application.

According to the present exemplary embodiment, an optical disc is one of a BD-R, a BD-RE, and a BD-ROM. In addition, according to the present exemplary embodiment, one of the surfaces of the substrate serves as a label-side surface. A recording layer for recording and reproducing information is formed on the other surface of the substrate. The label-side surface includes a mirror surface portion and a rough surface portion formed so as to be stepped upward from the mirror surface portion by 5 µm or less. Thus, visible display is formed on the label-side surface by using the mirror surface portion and the rough surface portion. The visible display formed in this manner is illustrated in FIG. 1A. FIG. 1A is a plan view of the label-side surface of the optical disc according to the present exemplary embodiment. The label-side surface includes a rough surface portion 6 and a mirror surface portion 7. For example, the mirror surface portion 7 is provided so as to form text, graphics, and a pattern. That is, in the example illustrated in FIG. 1A, the mirror surface portion 7 forms the text "ABC" and "DEF". That is, users can recognize the text using the contrast difference between the mirror surface portion 7 and the rough surface portion 6. Note that conversely, the text portion may be the rough surface portion 6, and the other portion may be the mirror surface portion 7.

Figure 1B:
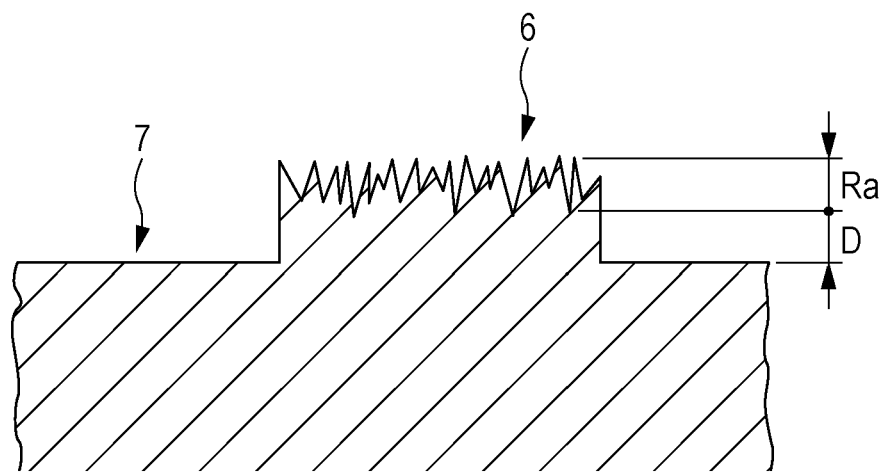

FIG. 1B is a schematic cross-sectional view of the rough surface portion 6 and the mirror surface portion 7. The mirror surface portion 7 has a flat surface. In contrast, the rough surface portion 6 is stepped upward from the mirror surface portion 7 with a step height D and has a rough surface. For example, the step height D is about 5 µm, and an average roughness Ra of the rough surface portion 6 is about 5 µm. Note that as illustrated in FIG. 1B, the step height D is defined as the distance between the lowermost point of the rough surface portion 6 (the point that is the closest to the mirror surface portion 7 in level) and the mirror surface portion 7.

2. Disc Manufacturing Process Flow

Figure 2:
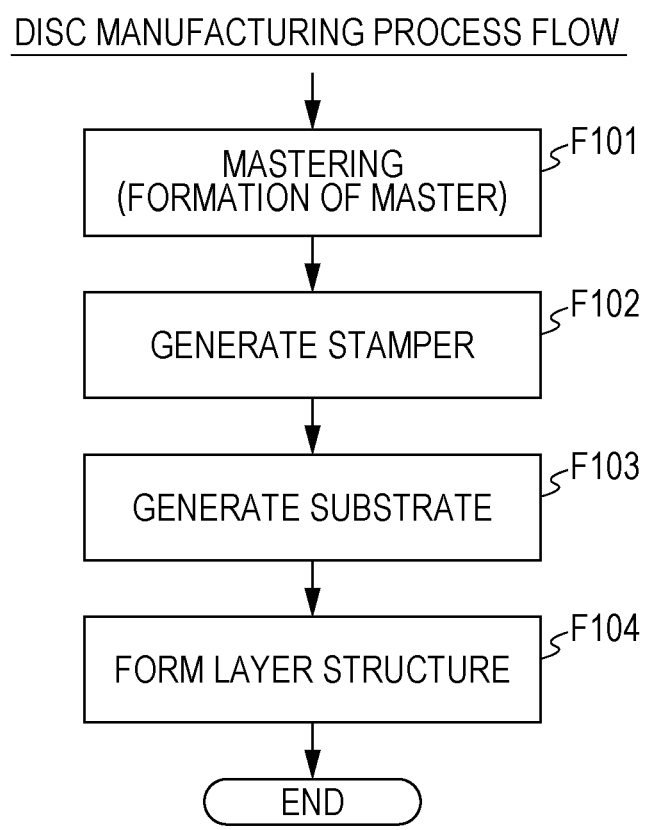
FIG. 2 is a flowchart illustrating a process flow for manufacturing the optical disc according to the embodiment.

The process flow for manufacturing an optical disc according to the present exemplary embodiment is described below with reference to FIG. 2, FIGS. 3A to 3D, FIGS. 4A and 4B, and FIGS. 5A to 5D. FIG. 2 is a flowchart illustrating the manufacturing process flow of the optical disc. Each of FIGS. 3A to 3D, FIGS. 4A and 4B, and FIGS. 5A to 5D illustrates one of the processes for manufacturing the optical disc. In this example, a BD-R or a BD-RE is manufactured.

Figure 3A:
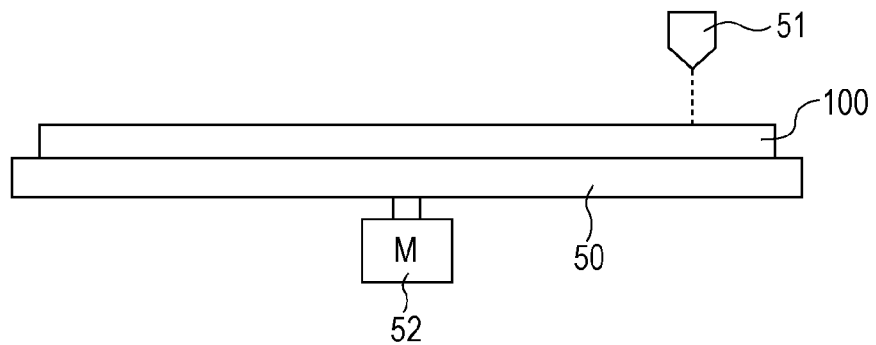
FIGS. 3A to 3D illustrate the process flow up to stamper generation according to the embodiment.
Figure 3B:
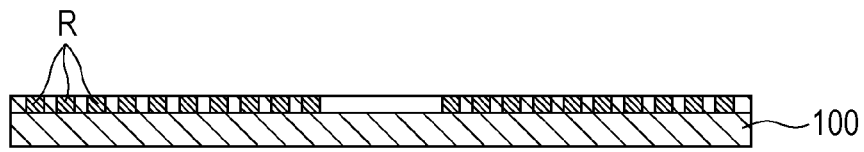
Figure 3C:
Figure 3D:
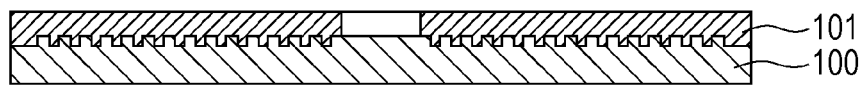

As illustrated in FIG. 2, in step F101, mastering is performed first. That is, an exposure operation is performed on a master using an exposure apparatus (a cutting machine). For example, as illustrated in FIG. 3A, a laser beam is emitted from an exposure head 51 onto a disc master 100 having a resist (e.g., an inorganic resist) applied thereonto. In this way, the exposure operation is performed. The disc master 100 placed on a turntable 50 is rotated by a spindle motor 52. At that time, the turntable 50 is moved in a slidable manner by a sliding mechanism (not shown). In this way, as illustrated in FIG. 7B, an exposure portion R is formed. In this case, the laser beam is deflected in accordance with a modulation signal based on, for example, the address information using, for example, an acousto-optical deflector (AOD), and the disc master 100 that is rotating is moved by the turntable 50 in a slidable manner. Accordingly, the exposure portion R is formed into a wobbling groove having a spiral pattern. Note that in the case of a ROM disc, the exposure portion R is formed so as to have a pit string pattern. Thereafter, a development operation is performed on the disc master 100 illustrated in FIG. 3B subjected to the exposure operation. Thus, as illustrated in FIG. 3C, the disc master 100 having an irregularity pattern in which the exposure portion is formed as a concave portion is generated. The concave portion serves as a groove of a final product of the optical disc.

Subsequently, in step F102, a stamper is generated. For example, the irregularities of the disc master 100 are transferred through a nickel electroforming process using the disc master 100 to generate a stamper 101 (refer to FIG. 3D). In the irregularity pattern of the stamper 101, a convex portion corresponds to the groove.

Figure 4A:
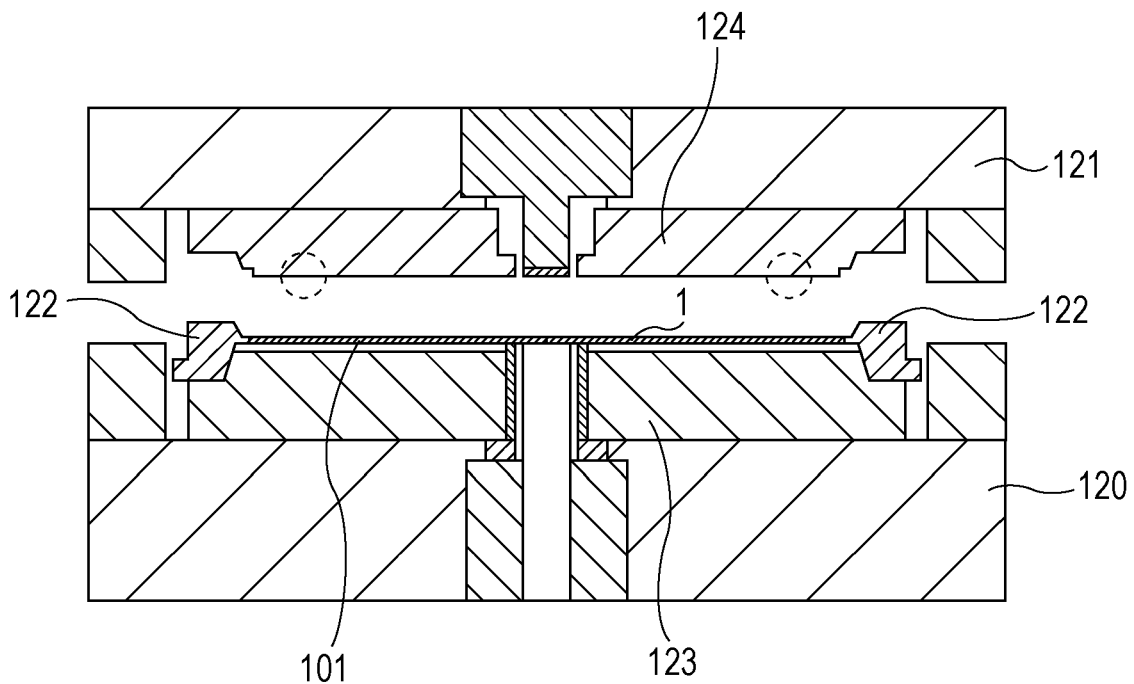
FIGS. 4A and 4B illustrate injection molding of a substrate according to the embodiment.

Subsequently, in step F103, substrate formation is performed. In the substrate formation, display on the label-side surface is also formed. FIG. 4A is a schematic illustration of a molding tool used for forming the substrate by injection molding. The molding tool has a lower cavity 120 and an upper cavity 121. The lower cavity 120 includes a signal-side surface mirror 123. In addition, the stamper 101 for transferring the groove is disposed on the signal-side surface mirror 123. The stamper 101 is fixed by a stamper holder 122. Furthermore, the upper cavity 121 includes a label-side surface mirror 124.

Figure 4B:
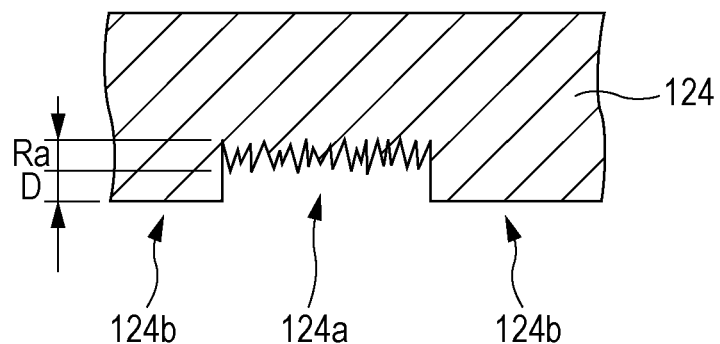

In FIG. 4B, a predetermined area of the label-side surface mirror 124, for example, an area encircled by a broken line, is enlarged and illustrated. As illustrated in FIG. 4B, a rough surface portion 124a is formed in this area, and the other portion is formed as a mirror surface portion 124b. For example, the label-side surface mirror 124 is formed from a mirror master using an SUS-based material. While the label-side surface mirror 124 is being produced, one of the surfaces of the mirror master is subjected to masking using a masking sheet having, for example, the text and graphic pattern to be displayed on the label-side surface. That is, the area corresponding to the mirror surface portion 124*b* is masked, and the area corresponding to the rough surface portion 124*a* is exposed. Thereafter, a chemical etching process is performed on the master subjected to masking in this manner. Thus, the exposed portion is roughened. In this way, the label-side surface mirror 124 having the exposed portion serving as the rough surface portion 124*a* and the masked portion serving as the mirror surface portion 124*b* is produced.

Note that as illustrated in FIG. 4B, the rough surface portion 124*a* is formed so as to have a rough surface that is stepped upward from the plane of the mirror surface portion 124*b* with the step height D. The step height D can be controlled by the etching time. In addition, the roughness of the rough surface portion 124*a* can be controlled by the type of solvent or the type of additive agent being used. Since the rough surface portion 124*a* is formed by etching, the rough surface portion 124*a* is formed as a concave portion of the label-side surface mirror 124.

Figure 5A:
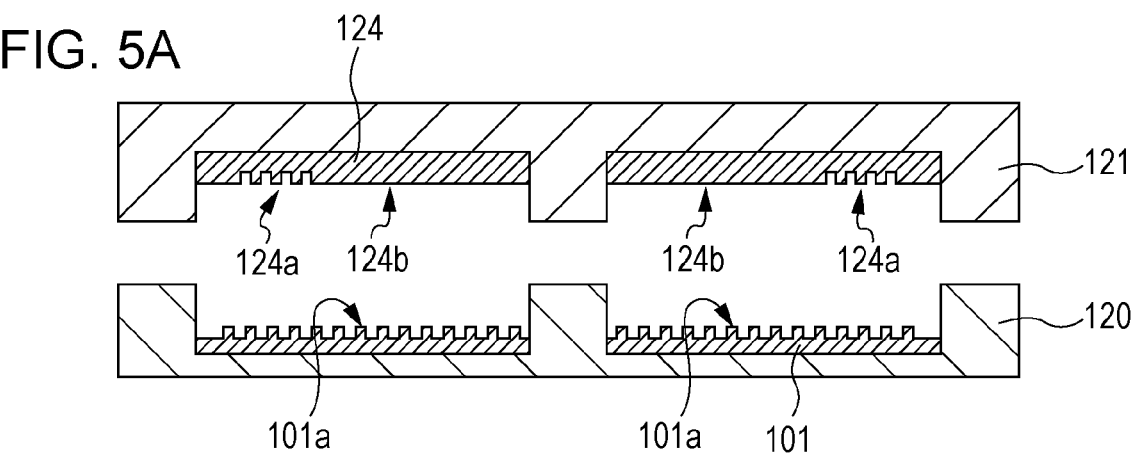
FIGS. 5A to 5D illustrate a process flow for manufacturing the optical disc according to the embodiment.

FIG. 5A is a more schematic illustration of the molding tool illustrated in FIGS. 4A and 4B. As illustrated in FIG. 5A, through an injection molding process using a molding tool in which the stamper 101 for transferring a groove and the label-side surface mirror 124 having the rough surface portion 124*a* formed thereon are disposed in this manner, a substrate 1 of a disc is formed of, for example, polycarbonate resin.

Figure 5B:
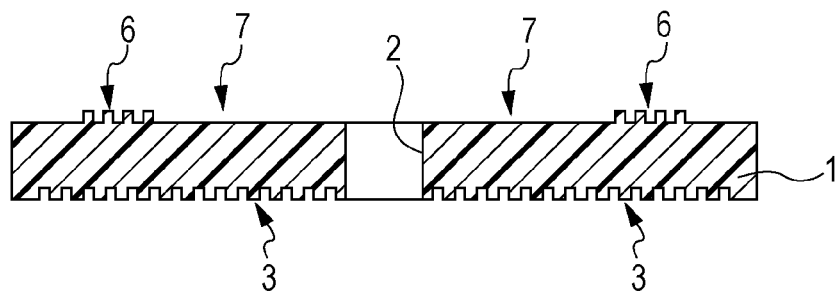

The molded substrate 1 is illustrated in FIG. 5B. That is, the substrate 1 formed of polycarbonate resin has a center hole 2 at the center thereof. In addition, a surface of the substrate 1 onto which a recording and reproduction laser beam is emitted has a groove pattern 3 formed by transferring an irregularity pattern (a groove pattern) 101*a* formed on the stamper 101 of the molding tool. Furthermore, the label-side surface of the substrate 1 has the irregularity pattern (the rough surface portion 124*a*/the mirror surface portion 124*b*) of the label-side surface mirror 124 transferred thereonto. That is, the label-side surface of the substrate 1 has the rough surface portion 6 and the mirror surface portion 7 formed thereon.

Figure 5C:
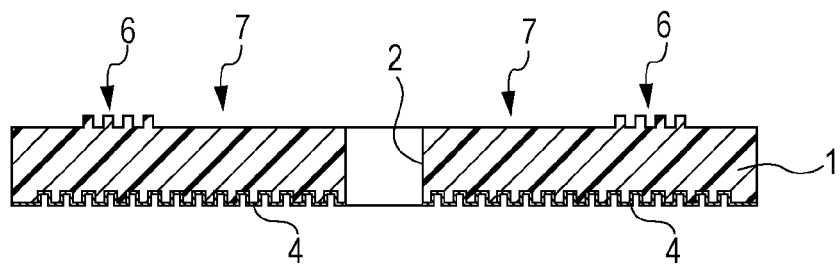
Figure 5D:
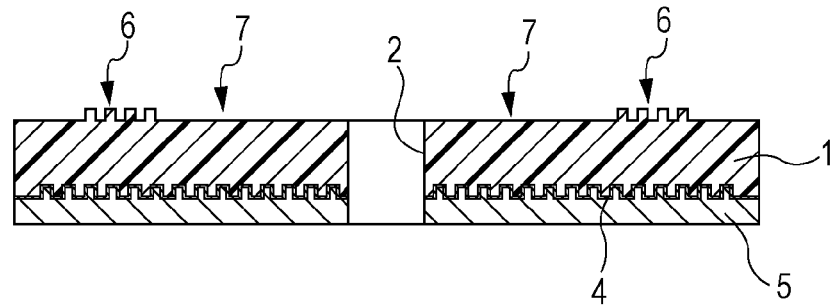

In step F104, formation of a layer structure including a recording layer is performed on the disc substrate 1. As illustrated in FIG. 5C, a recording layer 4 including a recording material layer made of a phase-change material or a photochromic material and a dielectric layer is formed on the surface of the substrate 1 having a groove/land shape formed thereon. In addition, as illustrated in FIG. 5D, a light transmissive layer (a cover layer) 5 is formed on the recording layer 4. For example, the light transmissive layer 5 is formed using spin-coat of an ultraviolet curable resin and emission of ultraviolet light to cure the ultraviolet curable resin. In this way, a recordable optical disc (a BD-R or a BD-RE) having a single layer (the recording layer 4) can be produced. The optical disc has a surface to which a recording and reproduction laser is emitted on the light transmissive layer 5 side, and the label-side surface of the optical disc has a display pattern, such as predetermined text, graphic, and a predetermined design pattern, formed using the rough surface portion 6 and the mirror surface portion 7.

Although the disc substrate 1 is schematically illustrated in FIGS. 5A to 5D, the thickness of the disc substrate 1 is about 1.1 mm, and the thickness of the light transmissive layer 5 is about 100 µm, in reality. In some cases, a hard coat layer is further formed on the light transmissive layer 5. If a disc including a plurality of recording layers (e.g., a dual-layer disc or a quad-layer disc) is produced, a plurality of recording layers are formed in formation of a layer structure performed in step F105. For example, in the case of producing a dual-layer disc, as illustrated in FIG. 5C, the recording layer 4 (a first recording layer) is formed. Thereafter, a material (an ultraviolet curable resin) for forming a spacer layer is coated on the recording layer 4 by a spin coating process. Subsequently, a groove pattern is transferred onto the spacer layer using a stamper that is formed for a second recording layer through the steps illustrated in FIGS. 3A to 3D. In such a case, the stamper is pressed onto the uncured ultraviolet curable resin (the spacer layer), and ultraviolet light is emitted to the ultraviolet curable resin. Thereafter, the stamper is moved away. In this way, a groove shape for the second recording layer is transferred. Subsequently, the second recording layer including a recording material layer made of a phase-change material or a photochromic material and a dielectric layer is formed on the surface having a groove/land shape formed thereon. Thereafter, a light transmissive layer 21 is formed on the second recording layer. In this way, a dual-layer disc including the first and second recording layers can be produced. In order to produce a disc including more layers, such as a triple-layer disc or a quad-layer disc, the above-described steps are repeated.

3. Effect of Rough Surface Portion on Tracking Operation and Visibility

According to the present exemplary embodiment, as illustrated in FIG. 1B, the produced optical disc has the label-side surface including the rough surface portion 6, and information is displayed on the label-side surface using the rough surface portion 6 and the mirror surface portion 7. In particular, according to the present exemplary embodiment, the step height D of the rough surface portion 6 with respect to the mirror surface portion 7 is less than or equal to 10 µm and is preferably between 10 µm and 1 µm, inclusive. In addition, the average roughness Ra of the rough surface portion 6 is between 10 µm and 2 µm, inclusive. It is desirable that the average roughness Ra be set to about 5 µm.

The rough surface portion 6 is provided in order to display information on the label-side surface. Accordingly, it is necessary that the step height D of the step of the rough surface portion 6 and the roughness of the rough surface portion 6 be determined so that excellent visibility, that is, a certain contrast difference between the rough surface portion 6 and the mirror surface portion 7 is obtained. In addition, if the structure of the rough surface portion 6 is not appropriate, a tracking error signal may be disturbed when a laser beam for recording and reproduction is emitted to the recording layer 4.

Figure 6A:
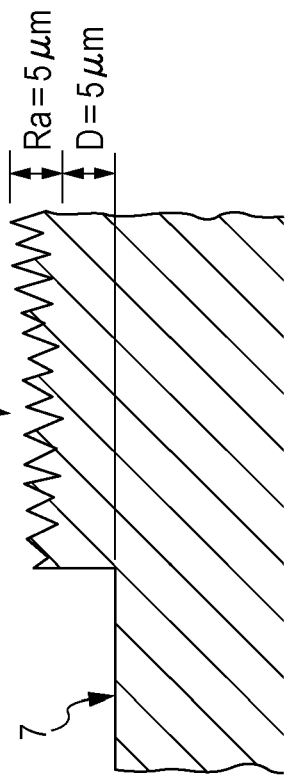
FIGS. 6A to 6D illustrate a rough surface portion and a tracking error signal.
Figure 6B:
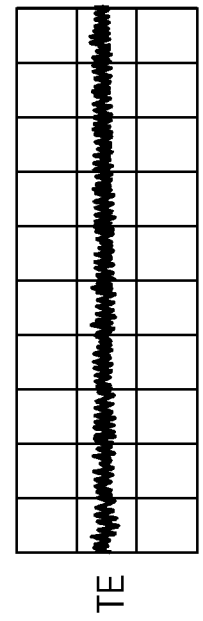

FIG. 6A illustrates an optical disc having the rough surface portion 6 configured so that the step height D=15 µm and the average roughness Ra=15 µm. FIG. 6B illustrates a tracking error signal TE obtained from a laser beam reflected by the recording layer 4 of such an optical disc. In an area indicated by "X" in FIG. 6B, a disturbance of the tracking error signal TE is observed. The area X corresponds to an area where the rough surface portion 6 is formed on the label-side surface. Such a disturbance of the tracking error signal TE occurs because the rough surface portion 6 having a high roughness causes the substrate to largely contract, and if a step having the step height D is formed, the contraction has an adverse impact on the shape of the groove formed on the opposite surface of the substrate from the rough surface portion 6.

Figure 6C:
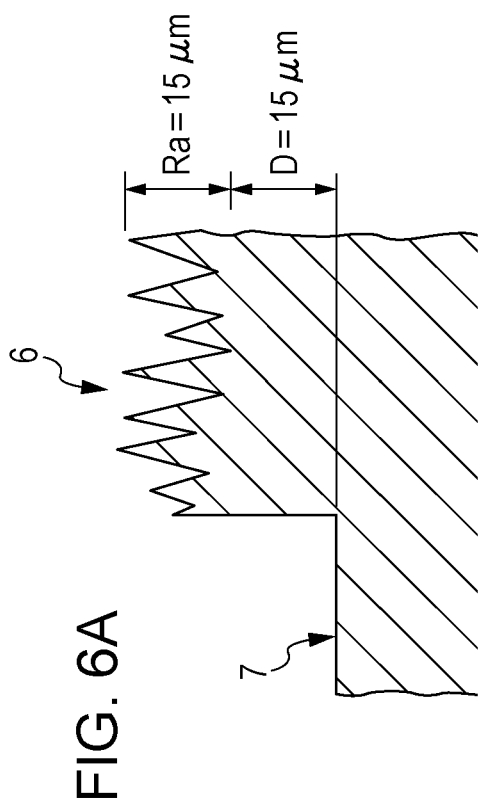
Figure 6D:
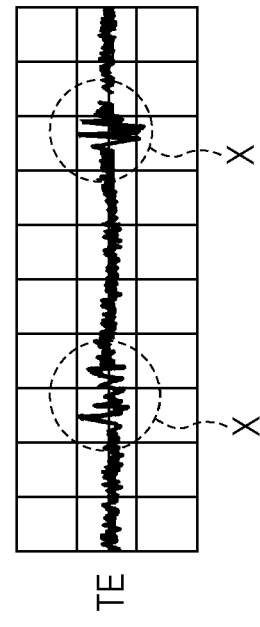

In contrast, FIG. 6C illustrates an optical disc having the rough surface portion 6 configured so that the step height D=5 µm and the average roughness Ra=5 µm. FIG. 6D illustrates a tracking error signal TE obtained from a laser beam reflected by the recording layer 4 of such an optical disc. In this case, any disturbance of the tracking error signal TE is not observed. Accordingly, it can be seen that a disturbance of the tracking error signal TE occurring during recording and reproduction can be prevented (or can be reduced to an allowable range) by appropriately setting the step height D of a step of the rough surface portion 6 when the rough surface portion 6 is formed on the label-side surface.

Therefore, the present inventors conducted an experiment to examine a variety of structures of the rough surface portion 6. FIG. 7 illustrates the residual error in the tracking error signal TE observed when the step height D and the average roughness Ra of the rough surface portion 6 are changed. Note that in the case of a BD-R and the 6× linear speed, it is necessary that the residual error be less than or equal to 20 nm at a position at which the radius is 40 mm. That is, since a BD has a track pitch of 320 nm, an offset of tracking of 20 nm or more is not acceptable. The 6× speed linear is chosen since the 6× linear speed is currently the highest linear speed of a BD. At that time, only the values in an area encircled by a broken line in FIG. 7 satisfy the above-described conditions. That is, the step height D is less than or equal to 10 μm, and the average roughness Ra is less than or equal to 10 μm. Therefore, the rough surface portion 6 acceptable in consideration of the effect on the tracking error signal TE has a step height D of 10 μm or less and an average roughness Ra of 10 μm or less.

The visibility is discussed next. If the average roughness Ra of the rough surface portion 6 is 2 μm or less, the visibility is decreased. The reason for this is that as the average roughness Ra is made closer to 0 μm, the rough surface portion 6 becomes more similar to a mirror surface. Accordingly, the contrast difference between the rough surface portion 6 and the mirror surface portion 7 decreases. In contrast, if the rough surface portion 6 has a certain level of fineness (e.g., about 5 μm), the rough surface portion 6 relatively whitens. Thus, the contrast difference between the rough surface portion 6 and the mirror surface portion 7 occurs, and the visibility increases. In addition, the step height D is determined through an etching process. As described above, it is desirable that the step height D be less than or equal to 10 μm. In terms of visibility, if the step height D is grater than a certain value, the rough surface portion 6 is easily recognizable from the mirror surface portion 7.

For the reason noted above, the step height D of the step of the rough surface portion 6 is set to a value less than or equal to 10 μm and, preferably, to a value between 10 μm and 1 μm, inclusive. In addition, the average roughness Ra of the rough surface portion 6 is set to a value between 10 μm and 2 μm inclusive, and, preferably, to about 5 μm. As described above, the rough surface portion 6 is formed on the label-side surface by transferring the rough surface portion 124*a* of the label-side surface mirror 124 onto the label-side surface when the substrate is generated in step F103 illustrated in FIG. 2 (refer to FIGS. 5A and 5B). Accordingly, if the concave portion of the rough surface portion 124*a* of the surface of the label-side surface mirror 124 has a concave step having a height of 10 μm or less and the average roughness Ra is between 10 μm and 2 μm inclusive, the optical disc according to the present exemplary embodiment can be produced. In order to form such a rough surface portion 124*a*, the etching time and the type of solvent for the label-side surface mirror 124 can be controlled. Thereafter, by forming the rough surface portion 6 of the disc substrate 1 using the label-side surface mirror 124, an optical disc having information displayed on the label-side surface and an excellent recording and reproduction performance (a tracking performance) can be provided.

In addition, for an optical disc according to the present exemplary embodiment, label printing is not necessary. Accordingly, the manufacturing cost can be advantageously reduced, and a printing process is not necessary.

While the above exemplary embodiment has been described with reference to a BD-R, the present application is applicable to a Blu-ray disc, such as a BD-RE and a BD-ROM, and an optical disc other than a Blu-ray disc. That is, the present application is applicable to an optical disc formed from a substrate having a label-side surface on one side and a recording layer for recording and reproducing information on the other side. In particular, the present application is suitable for a high-density optical disc that has a density higher than or equal to that of a Blu-ray disc having a track pitch of 0.32 μm or less. Furthermore, the present application is applicable to another type of recording medium, such as a card recording medium, in addition to a disc-shaped recording medium.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A recording medium comprising:
    a substrate having a label-side surface on one side and a recording layer for recording and reproducing information on the other side;
    wherein the label-side surface of the substrate has a mirror surface portion and a rough surface portion, a step having a step height of 10 μm or less is formed between the mirror surface portion and the rough surface portion, and an average roughness of the rough surface portion is between 10 μm and 2 μm inclusive,
    wherein visible information is formed on the label-side surface by using the mirror surface portion and the rough surface portion, and
    wherein the step height is a distance between a lowermost point of the rough surface portion and the mirror surface portion.

2. The recording medium according to claim 1, wherein the step height is between 10 μm and 1 μm inclusive, and the average roughness of the rough surface portion is about 5 μm.

3. The recording medium according to claim 2, wherein the recording layer has a groove pattern for recording information.

4. A method for manufacturing a recording medium, comprising:
    generating a substrate having one surface serving as a label-side surface and the other surface having an irregularity pattern for forming a recording layer, the label-side surface including a mirror surface portion, a rough surface portion, and a step having a step height of 10 μm or less formed between the mirror surface portion and the rough surface portion, visible information being formed on the label-side surface by using the mirror surface portion and the rough surface portion; and
    forming, on the irregularity pattern of the substrate, a layer structure including at least a recording layer and a cover layer,
    wherein an average roughness of the rough surface portion is between 10 μm and 2 μm inclusive, and
    wherein the step height is a distance between a lowermost point of the rough surface portion and the mirror surface portion.

5. The method according to claim 4, wherein the rough surface portion is formed so that the step height is between 10

μm and 1 μm, inclusive, and an average roughness of the rough surface portion is about 5 μm.

6. The recording medium according to claim 1, wherein the rough surface portion is stepped upward from a plane of the mirror surface portion.

\* \* \* \* \*